United States Patent Office 2,703,793
Patented Mar. 8, 1955

2,703,793

PROCESS FOR PREPARING INTERPOLYMERS OF SO₂ WITH PROPYLENE AND AN ACRYLATE

Marcus A. Naylor, Jr., Wilmington, Del., assignor to E. I. du Pont de Nemours and Company, Wilmington, Del., a corporation of Delaware No Drawing. Application July 10, 1951, Serial No. 236,065

2 Claims. (Cl. 260—79.3)

This invention relates to an improved process for the preparation of propylene/sulfur dioxide/methyl acrylate interpolymers.

Olefin/sulfur dioxide interpolymers have been known for many years, but they have not as yet achieved any important degree of commercial success. The olefin/sulfur dioxide interpolymers which have been prepared heretofore have had relatively poor melt-flow characteristics, and have been relatively unstable to heat. Numerous attempts have been made to improve these properties of the olefin/sulfur dioxide interpolymers. One method which has been employed in making molding powders from certain olefin/sulfur dioxide interpolymers has been to use an excess of sulfur dioxide, which in certain instances produces a mobile solution of the interpolymer which can be mixed with an inert liquid in which the resin is insoluble to produce a finely divided solid material which can be molded. Propylene/sulfur dioxide polymers cannot be molded in this manner without excessive amounts of gaseous decomposition products being formed in the mold.

Propylene/sulfur dioxide two-component interpolymers, as obtained by reaction between propylene and sulfur dioxide in an inert solvent at low temperatures, e. g. —30° to +90° C., preferably in the presence of free radical type polymerization catalysts, such as organic peroxides or azo compounds, are white amorphous solids of the formula $(C_3H_6 \cdot SO_2)_n$. The propylene/sulfur dioxide interpolymers obtained by such previously known processes underwent gradual decomposition to propylene and sulfur dioxide when heated to a temperature above 200° C. For example, when heated to about 230° C. the two-component polymer underwent a 23–28% weight loss in one hour. The ethylene/sulfur dioxide interpolymers are not so unstable, but the interpolymers of higher olefins, e. g. isobutylene, butene-2, etc., with sulfur dioxide are even more unstable than the propylene/sulfur dioxide interpolymers. These effects cannot readily be explained, especially because the sulfone link in low molecular weight compounds is thermally stable. Thus, dimethyl sulfone can be passed through a tube at 500° C. unchanged.

The effect of introducing third components into olefin/sulfur dioxide interpolymers was not known heretofore, although generic disclosures of multi-component sulfur dioxide polymers are found in the literature (cf., Brubaker, U. S. 2,241,900, which contains a generic disclosure of propylene/sulfur dioxide/methyl acrylate interpolymers).

In attempting to prepare three-component interpolymers from propylene, sulfur dioxide and alkyl acrylates problems arise in connection with controlling the relative amounts of the respective comonomers undergoing reaction. In the absence of an ionic or Friedel-Crafts type catalyst (as distinguished from a free radical producing catalyst, e. g. a peroxide) a propylene molecule will not attach itself to another propylene molecule, but will attach itself to a sulfur dioxide molecule. Sulfur dioxide, on the other hand, will not form a linear homopolymer. Accordingly, in propylene/sulfur dioxide polymers the ratio of propylene:sulfur dioxide is 1:1. Moreover, in the absence of ionic or Friedel-Crafts catalysts, alkyl acrylates will not interpolymerize with sulfur dioxide unless a compound which is polymerizable with both sulfur dioxide and the alkyl acrylate is also present, but will polymerize with an olefin, or form a homopolymer. Therefore, the polymers with which the present invention is concerned are those having predominantly propylene units adjacent to sulfur dioxide units along the chain, but having practically no sulfur dioxide units adjacent to alkyl acrylate units. As explained hereinafter, interpolymers having a long chain of adjacent alkyl acrylate units within the linear molecule are obtainable but are not the subject of the present invention.

An object of this invention is to provide a method for obtaining propylene/sulfur dioxide three-component interpolymers which have improved melt flow characteristics for molding applications, which do not decompose rapidly when heated at moderately elevated temperatures, e. g. temperatures within the range of about 200° to 250° C., and which have "heat distortion temperatures" sufficiently high for practical commercial utilization.

It has been discovered in accordance with this invention that stable interpolymers of improved thermal stability and other desirable properties can be obtained by interpolymerizing propylene with sulfur dioxide and a quantity of alkyl acrylate corresponding to the formula

$$(C_3H_6)_1(SO_2)_{1-n}(CH_2=CHCOO\ alkyl)_n$$

in which $n$ has a value of 0.25 to 0.36. If the value of $n$ substantially exceeds 0.36, the polymer is found to be heterogeneous due to the presence of molecules in which methyl acrylate units are attached to methyl acrylate units. If the value of $n$ is below 0.25 the polymer cannot be molded satisfactorily, because evolution of gaseous decomposition products takes place during molding. One of the important advantages of the present invention is its effectiveness in producing interpolymers which have a higher "heat distortion temperature" (ASTM method, D648–44T, 264 lb. load), than commercial polystyrene. A resin having a substantially lower "heat distortion temperature" than polystyrene is under a definite commercial disadvantage. Polystyrene has a "heat distortion temperature" of 80° C. Polymethyl acrylate has an even lower heat distortion temperature, as do the propylene/SO₂/polymethyl acrylate interpolymers in which $n$ has a value above 0.36. When $n$ is within the range of 0.25 to 0.36, however, the "heat distortion temperature" is not substantially below that of commercial polystyrene, and is not too low to meet commercial requirements.

In accordance with the present invention the interpolymerization of propylene, sulfur dioxide and alkyl acrylate is carried out at a temperature within the range of —50° to +90° C. If desired, a free radical-producing catalyst, such as an organic peroxy compound or an azo compound, may be employed. The interpolymerization may also be catalyzed by actinic light if desired. Any excess of propylene beyond the amount required by the formula hereinabove given remains unreacted and is recoverable as crude monomer. On the other hand, the quantity of alkyl acrylate employed should be approximately the quantity which is present in the desired interpolymer. If the quantity of alkyl acrylate is within the range hereinabove specified a relatively uniform interpolymer which is free of polyalkyl acrylate homopolymer is obtained.

The invention is illustrated further by means of the following examples.

*Example 1.*—120 grams of propylene and 20 grams of sulfur dioxide were added to an evacuated 500 ml. pressure resisting vessel containing 0.2 grams of alpha,alpha'-azo-bis-isobutyronitrile and 26.8 grams of methyl acrylate. After one hour at 75° C. a yield of 20.7 grams of white powdery polymer was obtained. This polymer, which had the formula $(C_3H_6)(SO_2)_{.77}(\text{methyl acrylate})_{.23}$ lost 3.3% of its weight on heating at 226° C. for one hour; in a similar test an unmodified propylene/SO₂ polymer lost 26% of its weight. For comparison with this result a series of copolymerizations was carried out in a similar manner, but the quantity of methyl acrylate was varied. The products were tested to determine their thermal stability, and also their behavior on molding. The variation of these properties with the value of $n$ in the formula $(C_3H_6)_1(SO_2)_{1-n}(\text{methyl acrylate})_n$ is recorded in the following table.

TABLE 1

*Effect of value of n in copolymers of formula*

$$(C_3H_6)_1(SO_2)_{1-n}(\text{methyl acrylate})_n$$

*on molding properties of these copolymers*

| Percent Methyl Acrylate by Weight | Value of n | Thermal Stability (Percent Weight Loss/Min. at 226° C.) | Behavior on Molding | Heat Distortion Temperature |
|---|---|---|---|---|
| 14.6 | .175 | 0.2 | Foamed | |
| 18.4 | .235 | 0.1 | ...do... | 89 |
| 19.4 | .25 | 0.08 | O. K. | 89 |
| 22.5 | .30 | 0.07 | O. K. | 81 |
| 27.2 | .36 | 0.05 | O. K. | 75 |

*Example 2.*—Experiments similar to those described in Example 1 were made, using ethyl acrylate in place of methyl acrylate, with similar results. The thermal stability of $(C_3H_6)_1(SO_2)_{1-n}(CH_2=CHCOOC_2H_5)_n$ interpolymer in which n had a value of 0.32 was 0.02 (per cent weight loss/min. at 226° C.).

*Example 3.*—The effect of solvents on the yield of polymer in the propylene/SO₂/methyl acrylate polymerizations was determined, as shown in the following table.

TABLE 2

*Effect of various media on batch interpolymerization of propylene/SO₂/methyl acrylate (0.2 gram alpha,-alpha'-azo-bis-isobutyronitrile catalyst)*

| Quantity of Monomers Used (grams) | | | Solvent | (ml.) | Cycle (hrs.) | Temp. (° C.) | [η]* | Yield |
|---|---|---|---|---|---|---|---|---|
| Propylene | Methyl Acrylate | SO₂ | | | | | | |
| 42 | 13.2 | 20 | MeOH | 200 | 2 | 75 | ---- | 0.5 g. pptd. by addition of water. |
| 50 | 13.2 | 20 | benzene | 150 | 2 | 70 | 0.48 | 13 g. not enough liquid for slurry. |
| 50 | 13.2 | 20 | ----do---- | 250 | 2 | 70 | 0.27 | 5.1 g. polymer in layer in liquid phase. |
| 50 | 13.2 | 20 | n-hexane | 150 | 2 | 70 | ---- | no appreciable product. |
| 110 | 13.2 | 20 | excess propylene | 250 | 2 | 70 | 1.46 | 27 g. powdery solid. |
| 9.7 | 3.4 | 4.8 | tetramethylene sulfone. | 85 | 4 | 64-66 | ---- | 8 g. |

I*nherent viscosity in conc. H₂SO₄.

The data in this table show that dilution of the monomers with the specified media, other than tetramethylene sulfone, and excess propylene, results in lower conversions, other conditions being similar, than with tetramethylene sulfone or excess propylene.

*Example 4.*—Propylene and sulfur dioxide were injected into a tubular reaction vessel along with catalyst and methyl acrylate, dissolved in tetramethylene sulfone, in the quantities given in the following table. Polymerization conditions and yields are also given in the table. The product was withdrawn from a controlled aperture at the opposite end of the tube.

TABLE 3

*Continuous interpolymerization of propylene, sulfur dioxide and methyl acrylate (alpha,alpha'-azo-bis-isobutyronitrile catalyst)*

| Run No | 1 | 2 | 3 |
|---|---|---|---|
| Feed Composition, Percent by Wt.: | | | |
| C₃H₆ | 15.8 | 13.4 | 13.7 |
| SO₂ | 7.8 | 6.6 | 8.2 |
| Methyl Acrylate | 5.7 | 4.8 | 3.0 |
| Tetramethylene Sulfone | 70.7 | 75.2 | 75.1 |
| Catalyst Concentration (grams per million cc.) | 400 | 400 | 400 |
| Temperature | 65 | 85 | 65 |
| Yield, Percent | 70 | 37 | 44-48 |

It is to be understood that the foregoing examples are illustrative only, and that numerous other embodiments of the invention will occur to those who are skilled in the art. For example, the interpolymerization takes place with free radical producing catalysts generally, and is not limited to the use of alpha,alpha'-azo-bis-isobutyronitrile. Suitable free radical producing catalysts include benzoyl peroxide, dialkyl peroxide, ditertiary butyl peroxide, alkyl peresters, alkyl hydroperoxides, etc.

The interpolymers obtained in the practice of this invention are useful in the manufacture of molded articles. The following properties characterize moldings of propylene/SO₂/methyl acrylate polymers of the formula $$(C_3H_6)_1(SO_2)_{1-n}(\text{methyl acrylate})_n$$

in which n has a value of from 0.25 to 0.36.

Injection molding temperature—160° C. to 230° C.
Izod impact strength—about 0.39
Tensile strength (lbs. per sq. in.)—6000 to 7000
Water absorption (24 hours' immersion)—0.3 to 0.4%
Density—1.3 to 1.4
Appearance of moldings—translucent to transparent colorless to white to yellow.

As illustrated in the foregoing examples, one of the preferred embodiments of the invention involves the continuous interpolymerization of propylene with sulfur dioxide and methyl acrylate in tetramethylene sulfone as a solvent medium. If the tetramethylene sulfone contains an inhibitor (such as hydroquinone) the inhibitor should be removed (e. g. by washing with caustic, and subsequently distilling) prior to use as a polymerization medium. After being used in the reaction mixture the tetramethylene sulfone can be recovered by any suitable method, such as by direct distillation.

The interpolymerization of propylene with sulfur dioxide and methyl acrylate in accordance with the present invention can be carried out in any suitable eqiupment, such as a stainless steel pressure-resistant autoclave equipped with an agitator and cooling jacket. The jacket temperature can be controlled by any appropriate means, such as by a jacket into which may be injected cold water and/or steam. Agitation with a flat paddle (1 inch by 4 inch for a 4-liter autoclave operating at approximately 180 revolutions per minute) is entirely suitable. In continuous operation tubular reaction vessels are preferred, and conditions of either turbulent or straight-line flow may be employed. In continuous operation it is preferred to meter the respective ingredients separately by means of calibrated rotameters. Numerous other methods for measuring the ingredients, controlling polymerization temperature, and recovering ingredients of the crude polymerization products, will of course occur to those who are skilled in the art.

I claim:

1. A process for preparing a thermally stable interpolymer of propylene, sulfur dioxide and alkyl acrylate in which the alkyl group contains from 1 to 2 carbon atoms, which comprises continuously passing a mixture of propylene/sulfur dioxide, the said acrylate, tetramethylene sulfone, and catalytic quantity of alpha,alpha'-azo-bis-isobutyronitrile, into a reaction vessel while controlling the quantity of alkyl acrylate introduced so that it is the quantity required by the formula $(C_3H_6)_1(SO_2)_{1-n}(\text{alkyl}$ acrylate)$_n$, $n$ having the value of 0.25 to 0.36, said continuous polymerization being carried out at a temperature within the range of 60° C. to 90° C.

2. The process of claim 1 in which the said alkyl acrylate is methyl acrylate.

References Cited in the file of this patent

UNITED STATES PATENTS

| | | |
|---|---|---|
| 2,146,276 | Wilder | Feb. 7, 1939 |
| 2,192,467 | Frey | Mar. 5, 1940 |
| 2,507,526 | Jacobson | May 16, 1950 |